United States Patent [19]

Daws

[11] 4,131,378

[45] Dec. 26, 1978

[54] SELF-LOCKING HINGE

[75] Inventor: Lee F. Daws, Kingston, Canada

[73] Assignee: Her Majesty the Queen in right of Canada, as represented by the Minister of National Defence, Ottawa, Canada

[21] Appl. No.: 867,836

[22] Filed: Jan. 9, 1978

[30] Foreign Application Priority Data

Jan. 11, 1977 [CA] Canada ................................ 269457

[51] Int. Cl.$^2$ ............................................ F16C 11/10

[52] U.S. Cl. ........................................ 403/93; 16/183

[58] Field of Search ................ 403/102, 93, 100, 103, 403/166, 96; 16/183, 143, 145, 178; 135/15 PQ, 20 M; 59/79 A

[56] References Cited

U.S. PATENT DOCUMENTS 1,363,715 12/1920 Brown ................................ 16/143

3,187,373 6/1965 Fisher ............................ 403/102 X 3,514,893 6/1970 Paksy .............................. 16/183 X

*Primary Examiner*—Andrew V. Kundrat

*Attorney, Agent, or Firm*—Murray & Whisenhunt

[57] ABSTRACT

A self-locking hinge for interconnecting two structural elements such as sections of tent poles includes a pair of bifurcated lugs in opposed end-to-end relationship and a yoke extending between the arms of the lugs. A pin extends through the arms of each lug and a slot or slots in the yoke for pivotally connecting the lugs to the yoke. The pins are biased towards each other by a spring in the slot or by springs in the slots, so that projections on the arms of one lug are biased into grooves in the arms on the other lug to lock the hinge in an open position. In order to close the hinge, the lugs are pulled slightly apart against the action of the spring(s) to remove the projections from the grooves, permitting rotation of the lugs relative to the yoke and to each other.

5 Claims, 4 Drawing Figures

SELF-LOCKING HINGE

BACKGROUND OF THE INVENTION

This invention relates to a self-locking hinge, and in particular to a hinge for use between two relatively rotatable structural elements.

The hinge of the present invention is primarily intended for interconnecting sections of tent poles, whereby the frame of the tent can be folded to form a compact package. From the following description, it will readily be appreciated that the hinge is capable of much wider application. However, for the sake of simplicity, the hinge will be described for interconnecting a pair of cylindrical structural members only.

SUMMARY OF THE PRIOR ART

In the construction of foldable frames for tents, parabolic solar collectors, antennae, lawn chairs, etc. using aluminium tubing or the like, a self-locking hinge is desirable, and in some cases a necessity. For example, in the construction of a survival tent designed to be transported by aircraft and dropped at a remote location, strength, weight and volume are important considerations. Perhaps even more important is ease of erection.

There are presently available a variety of hinges for use with cylindrical structural elements. Some such hinges are self-locking and others are locked by means of separate locking devices, e.g. pins or catches. Moreover, many such hinges are bulky and do not result in a streamline package in either the folded or opened condition of the frame.

SUMMARY OF THE INVENTION

The object of the present invention is to provide a self-locking hinge for interconnecting two relatively rotatable or foldable structural elements, particularly cylindrical structural elements which is of relatively simple construction, easy to operate and streamline.

Accordingly, the invention relates to a self-locking hinge for interconnecting two relatively foldable structural elements comprising a pair of lugs for connection to the elements in opposed end-to-end relationship, the opposed ends of each lug having a pair of arms with a recess therebetween, at least one arm on one lug having a locking projection, at least one arm on the other lug having a locking groove for receiving said projection to lock said lugs in an open position; a yoke extending from between the pair of arms of one lug to between the arms of the other lug; pin means extending through each pair of arms and said yoke for pivotally connecting each lug to the yoke; at least one slot in said yoke permitting movement of said pin means and consequently disengagement of said locking projection and groove, whereby both lugs can be rotated about the axis of said pin means to a closed position; and spring means in said slot biasing said pins means of one lug toward the pin means of the other lug, and consequently biasing the lugs toward each other to maintain the locking projection in said groove when the lugs are in the open position.

In this specification and the appended claims, by "open" is meant a position in which the lugs are aligned, their longitudinal axes defining a straight line, and by "closed" is meant a position in which the lugs are substantially parallel. Thus, when the hinge is used to interconnect sections of a tent pole, when the pole is erect, the hinge and lugs will be in the open position, and when the sections of the pole are folded onto each other, hinge and lugs will be in a closed position.

In the preferred form, each arm of one lug is provided with a generally rectangular locking projection, and each arm of the other lug includes a generally rectangular groove for receiving the projection. The lugs are biased towards each other by a single spring in an elongated slot in the yoke interconnecting the pins, to pull the lugs together, or by a pair of springs in two separate aligned slots in the yoke pushing the pins and consequently the lugs towards each other. Thus, when the jugs are in the open position, the locking projections are biased into the grooves, and the hinge cannot be closed by an ordinary bending action, i.e. by rotating one lug with respect to the other. It is necessary to force the lugs apart until the locking projections are free of or capable of rotating with respect to the grooves, and then bending or rotating either or both of the lugs with respect to the yoke in order to close the hinge.

DESCRIPTION OF THE DRAWINGS

The invention will now be described in greater detail with reference to the accompanying drawings, which illustrate two preferred embodiments of the invention, and wherein.

DESCRIPTION OF THE PREFERRED EMBODIMENT

Figure 1:
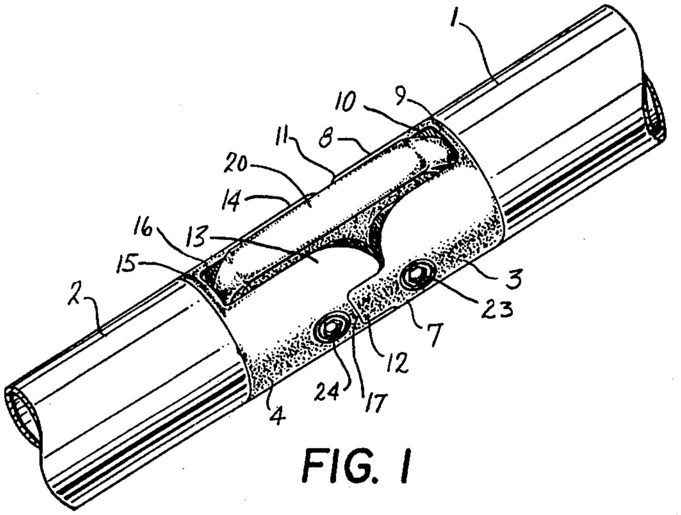
FIG. 1 is a perspective view of the hinge of the present invention in an open position interconnecting two tubular structural elements.
Figure 2:
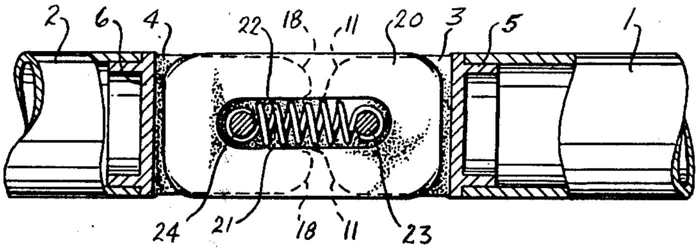
FIG. 2 is a longitudinal sectional view of the hinge of FIG. 1 in the open position.
Figure 3:
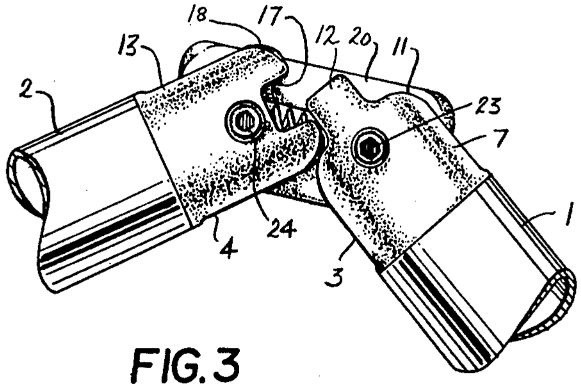
FIG. 3 is a longitudinal sectional view of the hinge of FIG. 1 in the partially closed position.

With reference to FIGS. 1 to 3, a hinge in accordance with the present invention when used for inter-connecting a pair of tubular sections 1 and 2 of a tent post or other structural element includes a pair of lugs 3 and 4 connected to the tubular sections 1 and 2, respectively. In the present case, the lugs 3 and 4 are connected to caps 5 and 6 (FIG. 2) which are inserted into the open ends of the tubular sections 1 and 2. Any other suitable manner of connecting the lugs 3 and 4 to structural elements may be employed. For example, the trailing ends of the lugs 3 and 4 could be provided with reduced diameter, threaded portions for mating with internally threaded tubes.

The lug 3 is bifurcated, including a pair of arms 7 and 8 interconnected at their trailing end by a bight 9, the arms and bight defining the sides and end of a rectangular recess 10. The front corners 11 of the arms 7 and 8 are rounded to reduce friction between abutting elements of the hinge. A rectangular locking projection 12 is provided at the centre of the front end of each arm 7 and 8.

The lug 4 is also bifurcated with similar arms 13 and 14 interconnected by a bight 15, the arms and bight defining a rectangular recess 16 opposing the recess 10. Each arm 13 and 14 includes a rectangular locking groove 17 in the centre of the front end thereof for receiving one of the projections 12. The front corners 18 of the arms 13 and 14 are also rounded, as are the corners of the projections 12 and grooves 17 for reducing friction during opening or closing of the hinge.

The lugs 3 and 4 are interconnected by a yoke 20 extending into each of the recesses 10 and 16 between the arms 7 and 8 and 13 and 14, respectively. The yoke 20 is in the form of a rectangular parallelepiped with rounded corners for facilitating closing of the hinge. A longitudinally extending slot 21 is provided in the centre of the yoke 20 for receiving a helical spring 22 and pin means in the form of set screws 23 and 24. The set screws 23 and 24 extend through the arms 7 and 8, and 13 and 14, respectively, and through the ends of the slot 21. The ends of the spring 22 are looped around the screws 23 and 24 for biasing the screws towards each other; thus pulling the lugs 3 and 4 together. Such action normally maintains the hinge in the open position (FIGS. 1 and 2).

Figure 4:
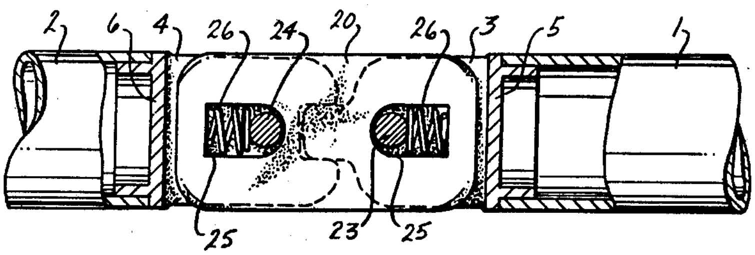
FIG. 4 is a longitudinal sectional view of another embodiment of the present invention.

In the hinge of FIG. 4, the slot 21 in the yoke 20 is replaced with a short slot 25 at each end of the yoke 20. Each slot 25 contains a spring 26 which bears against one of the screws 23 or 24, forcing the screws and consequently the lugs 3 and 4 towards each other to maintain the hinge in the open position (FIGS. 1 and 4).

In order to close either form of the hinge (FIG. 3), the lugs 3 and 4, which are normally locked in the open position by the spring 22 or springs 26, are pulled apart, and the lugs 3 and 4 are rotated about the axes of the screws 23 and 24. With the hinge of FIGS. 1 to 3, the spring 22 is stretched during closing of the hinge, and, with the hinge of FIG. 4, the springs 26 are compressed during closing of the hinge. Because the front corners of the lugs 3 and 4 are rounded, it is easy to close or open the hinge. As shown in FIG. 3, the concave corner at the inner end of the locking projection 12 complements the convex corner 18 of the lug 4, the lugs 3 and 4 sliding over each other during opening or closing of the hinge.

It will be appreciated that the structural members connected by the hinge can be tubular or solid, and have virtually any cross-sectional configuration. Actually, it would be possible to use two or more hinges to connect two elongated structural members at two or more locations along their length. Of course, it would be important that the longitudinal axis of the hinges be parallel; otherwise, it would be difficult if not impossible to move the hinges between the closed and open positions, and vice versa.

While the yoke is illustrated as a rectangular parallelepiped, it could equally be elliptical or circular depending upon the shape of the arms of the lugs.

It will also be appreciated that while the spring means in the preferred forms of the invention is one or more helical springs, other spring means could be employed. The same considerations apply to the screws, which could be replaced with other pin means, e.g. rivets.

An important feature of the hinge when used in a tent pole is that the open hinge is flush with the sides of the pole sections, resulting in a streamline structure when the tent is erect. Moreover, because the hinge can be closed to a position where the pole sections are parallel, the tent poles can readily be folded to form a compact package.

The embodiments of the invention in which an exclusive property or privilege is claimed are defined as follows:

1. A self-locking hinge for interconnecting two relatively foldable structural elements comprising a pair of lugs for connection to the elements in opposed end-to-end relationship, the opposed ends of each lug having a pair of arms with a recess therebetween, at least one arm on one lug having a locking projection, at least one arm on the other lug having a locking groove for receiving said projection to lock said lugs in an open position; a yoke extending from between the pair of arms of one lug to between the arms of the other lug; at least one slot in said yoke, pin means extending through each pair of arms and said slot in the yoke for pivotally connecting each lug to the yoke; the slot permitting limited movement of said pin means in a direction generally axially of said lugs, for consequent disengagement of said locking projection and groove, whereby both lugs can be rotated about the axis of the pin means to a closed position; and spring means in said slot biasing the pin means of one lug toward the pin means of the other lug, and consequently biasing the lugs towards each other to maintain the locking projection in said groove when the lugs are in the open position, the springs means permitting limited movement of the pin means and lugs away from each other for closing the hinge.

2. The hinge according to claim 1, wherein said yoke includes a single slot, said spring means being a single spring extending between and interconnecting said pin means for biasing the lugs towards each other when the hinge is in the open position.

3. The hinge according to claim 1, wherein said yoke includes a pair of spaced apart slots, the pin means of one lug extending through one of said slots and the pin means of the other lug extending through the other of said slots; said spring means being a spring in each of said slots biasing the lugs towards each other when the hinge is in the open position.

4. The hinge according to claim 1 wherein each arm of said one lug includes a locking projection and each arm of said other lug includes a locking groove.

5. The hinge according to claim 1 wherein said locking projection and groove are substantially rectangular.

* * * * *